(12) United States Patent
Asai

(10) Patent No.: US 11,799,326 B2
(45) Date of Patent: Oct. 24, 2023

(54) CONTROL SYSTEM AND CONTROL METHOD FOR THE SAME

(71) Applicant: CANON KABUSHIKI KAISHA, Tokyo (JP)

(72) Inventor: Hitoshi Asai, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/935,503

(22) Filed: Sep. 26, 2022

(65) Prior Publication Data

US 2023/0098740 A1   Mar. 30, 2023

(30) Foreign Application Priority Data

Sep. 28, 2021   (JP) ................................ 2021-157656

(51) Int. Cl.
*H02J 50/20* (2016.01)
*H02M 5/293* (2006.01)

(52) U.S. Cl.
CPC ............ *H02J 50/20* (2016.02); *H02M 5/293* (2013.01); *H02J 2207/20* (2020.01)

(58) Field of Classification Search
CPC .... H02M 5/293; H02M 5/225; H02M 5/2932; H02M 1/327; H02J 50/20; H02J 2207/20
USPC ................................................. 307/104, 142
See application file for complete search history.

(56) References Cited

U.S. PATENT DOCUMENTS

| 9,391,461 | B2 * | 7/2016 | Kim ...................... H02J 50/12 |
| 2010/0172168 | A1 * | 7/2010 | Fells ..................... H02M 1/12 |
| | | | 363/164 |
| 2017/0033591 | A1 * | 2/2017 | Govindaraj ............ H02J 50/10 |
| 2018/0241301 | A1 * | 8/2018 | Nagaoka ................. H02M 1/14 |
| 2020/0373787 | A1 * | 11/2020 | Ide ......................... H02J 50/90 |

FOREIGN PATENT DOCUMENTS

JP     2018054847 A     4/2018

* cited by examiner

*Primary Examiner* — Quan Tra
(74) *Attorney, Agent, or Firm* — Canon U.S.A., Inc. IP Division

(57) ABSTRACT

A power transmission unit includes an alternating-current power source that outputs alternating-current power, a clock generation unit that generates a clock signal higher in frequency than the alternating-current power, and a power transmission antenna that wirelessly transmits the power. A power reception unit includes, a power reception antenna that receives wirelessly the power from the power transmission antenna, and a rectification circuit that rectifies a voltage output from the power reception antenna and outputs the alternating-current power. A control system includes a correction unit that estimates a property change in one or more passive elements included in at least one of the power transmission unit or the power reception unit, and corrects a phase of the clock signal or the alternating-current power output from the alternating-current power source to maintain linearity between the alternating-current power output from the alternating-current power source and the alternating-current power output from the rectification circuit.

16 Claims, 8 Drawing Sheets

FIG.4A

| INDUCTOR 601 CHANGE AMOUNT | CLOCK SIGNAL FREQUENCY | CLOCK SIGNAL Duty |
|---|---|---|
| 0% | 1.880 MHz | 0.430 |
| -10% | 1.875 MHz | 0.435 |
| -20% | 1.870 MHz | 0.440 |

FIG.4B

| INPUT VOLTAGE VALUE | INDUCTOR 601 CHANGE AMOUNT |
|---|---|
| 0V TO LESS THAN 10V | 0% |
| 10V TO LESS THAN 20V | -10% |
| 20V TO LESS THAN 30V | -20% |

FIG.4C

| CURRENT MEASUREMENT VALUE | INDUCTOR 601 CHANGE AMOUNT |
|---|---|
| LESS THAN 1A | 0% |
| 1A TO LESS THAN 2A | -10% |
| 2A TO LESS THAN 3A | -20% |

FIG.4D

| TEMPERATURE MEASUREMENT VALUE | INDUCTOR 601 CHANGE AMOUNT |
|---|---|
| LESS THAN 25°C | 0% |
| 25°C TO LESS THAN 55°C | -10% |
| 55°C OR HIGHER | -20% |

FIG.4E

| INDUCTOR 601 CHANGE AMOUNT | INPUT VOLTAGE VALUE CORRECTION COEFFICIENT |
|---|---|
| 0% | 0% (WITHOUT CORRECTION) |
| -10% | +2.5% |
| -20% | +5% |

CONTROL SYSTEM AND CONTROL METHOD FOR THE SAME

BACKGROUND

Field

The present disclosure relates to a control system and a control method for the control system.

Description of the Related Art

There are systems that supply electric power to drive a motor. For example, a semiconductor exposure apparatus includes a fine-motion stage that finely moves a wafer to form a pattern on the wafer and a motor for driving the fine-motion stage over a coarse-motion stage for moving the wafer to an exposure position. A power supply cable is connected to the motor on the coarse-motion stage to supply power to the motor for driving the motor. Since this cable moves along with the movement of the coarse-motion stage, tensile force in the cable can affect the positioning accuracy of the stage. Thus, wirelessly performing power transmission for driving the motor is being developed.

A motor that moves the stage operates on an alternating-current voltage. This is because, for example, the positive voltage moves the stage uniaxially in the positive direction, and the negative voltage moves the stage in the negative direction. In order to move the fine-motion stage, an alternating-current voltage is applied to the motor mounted on the coarse-motion stage.

An alternating-current voltage to be applied to the motor is generally produced by a circuit called a motor driver. A direct-current voltage and a control signal supplied to a motor driver causes the motor driver to produce an alternating-current voltage to be applied to the motor. Japanese Patent Application Laid-Open No. 2018-54847 describes a configuration of a wireless motor driving system in which a motor driver is arranged on a coarse-motion stage and an alternating-current voltage is applied to a motor mounted on the coarse-motion stage through wireless power transmission. The coarse-motion stage is located on the power reception side of wireless power transmission, and a power reception unit of wireless power transmission is arranged on the coarse-motion stage. When a direct-current voltage is wirelessly transmitted to the power reception unit on the coarse-motion stage to supply the direct-current voltage with the motor driver on the coarse-motion stage, the motor driver produces an alternating-current voltage to be applied to the motor on the coarse-motion stage to drive the motor.

SUMMARY

Various embodiments of the present disclosure are directed to maintaining linearity between the alternating-current power output from an alternating-current power source and the alternating-current power output from a rectification circuit.

According to various embodiments of the present disclosure, a control system includes a power transmission unit configured to wirelessly transmit alternating-current power, and a power reception unit configured to wirelessly receive the power from the power transmission unit. The power transmission unit includes an alternating-current power source configured to output the alternating-current power, a clock generation unit configured to generate a clock signal higher in frequency than the alternating-current power, a switch circuit configured to perform switching the alternating-current power at a timing determined by the clock signal, and a power transmission antenna configured to wirelessly transmit the power subjected to performing switching by the switch circuit. The power reception unit includes a power reception antenna configured to wirelessly receive the power from the power transmission antenna, and a rectification circuit configured to rectify a voltage output from the power reception antenna and output the alternating-current power. The control system includes a correction unit configured to estimate a property change in one or more passive elements included in at least one of the power transmission unit or the power reception unit, and correct a phase of the clock signal or the alternating-current power output from the alternating-current power source to maintain linearity between the alternating-current power output from the alternating-current power source and the alternating-current power output from the rectification circuit.

Further features of the present disclosure will become apparent from the following description of example embodiments with reference to the attached drawings.

BRIEF DESCRIPTION OF THE DRAWINGS

FIGS. 4A to 4E are diagrams illustrating the amounts of changes in inductor value according to one embodiment.

DESCRIPTION OF THE EMBODIMENTS

[System Configuration]

Figure 1:
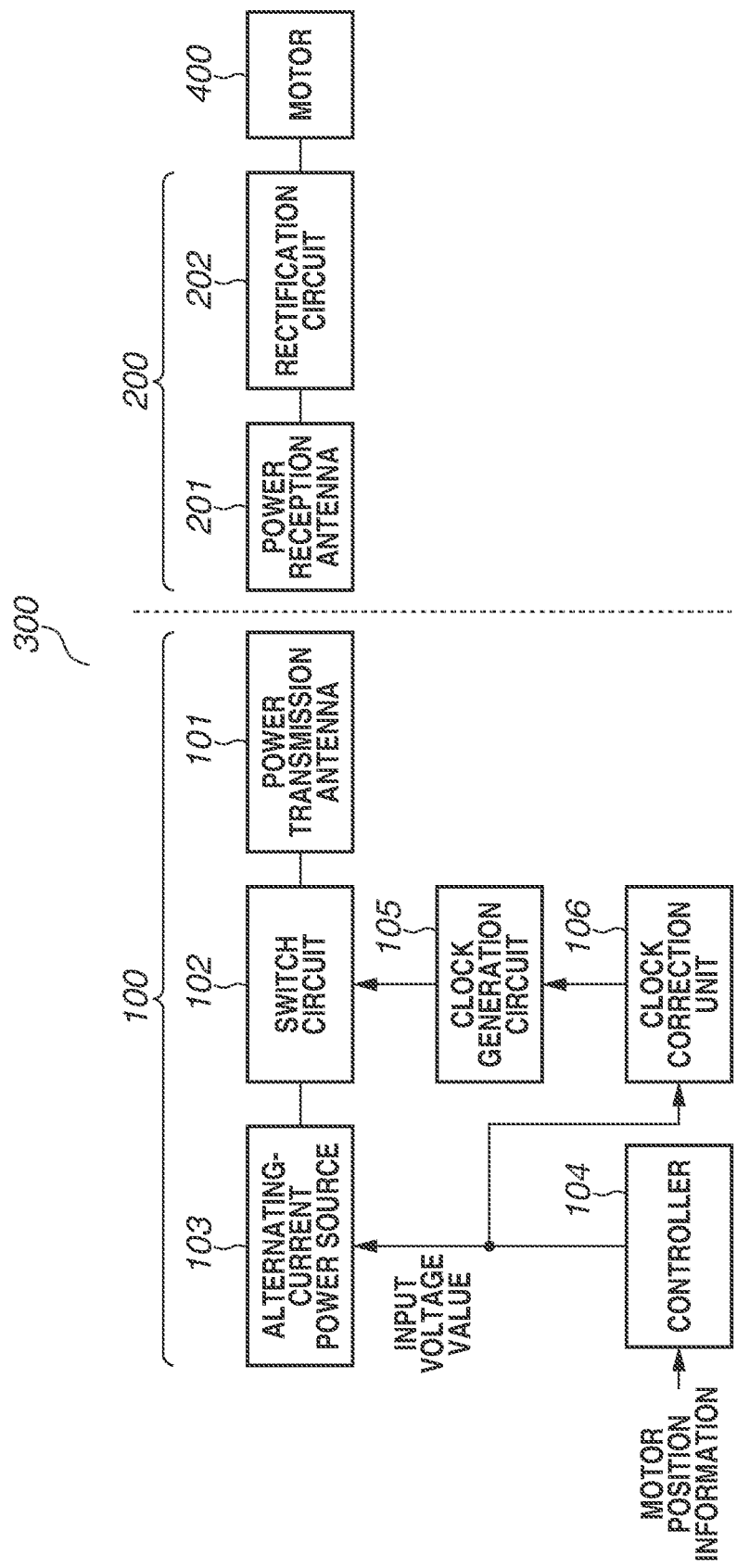
FIG. 1 is a block diagram illustrating a configuration example of a control system according to one embodiment.

FIG. 1 is a block diagram illustrating a configuration example of a control system 300 according to a first example embodiment.

The control system 300 includes a power transmission unit 100, a power reception unit 200, and a motor 400. A power transmission antenna 101 and a power reception antenna 201 are coupled to each other via magnetic field coupling so that power is transmitted in a non-contact manner. The power transmission antenna 101 and the power reception antenna 201 may be coupled though, other than magnetic field, electric field or electromagnetic field. Hereinafter, a control method for the control system 300 will be described.

The power transmission unit 100 includes the power transmission antenna 101, a switch circuit 102, an alternating-current power source 103, a controller 104, a clock generation circuit 105, and a clock correction unit 106. The controller 104 determines the value of voltage to be applied to the motor 400 based on motor position information related to the motor 400, and outputs an instruction for the input voltage value to the alternating-current power source 103. The alternating-current power source 103 outputs an alternating-current voltage based on the instruction for the input voltage value to the switch circuit 102. The switch circuit 102 performs switching of the alternating-current voltage supplied from the alternating-current power source 103 with a higher frequency than the frequency of the alternating-current voltage supplied from the alternating-current power source 103, and outputs to the power transmission antenna 101. The clock generation circuit 105 produces a clock signal for defining a timing for the switch circuit 102 to perform switching of the alternating-current voltage, and outputs the clock signal to the switch circuit 102. Detailed operations of the clock correction unit 106 will be described below.

The power reception unit 200 includes the power reception antenna 201 and a rectification circuit 202. The power reception antenna 201 receives power emitted from the power transmission antenna 101. The rectification circuit 202 restores the waveform of the alternating-current voltage received by the power reception antenna to the original waveform of the alternating-current voltage (the waveform of the alternating-current voltage output from the alternating-current power source 103), and supplies the restored alternating-current voltage to the motor 400.

At least one block of the switch circuit 102, the power transmission antenna 101, the power reception antenna 201, or the rectification circuit 202 has a resonance circuit for efficient power transmission.

Figure 2:
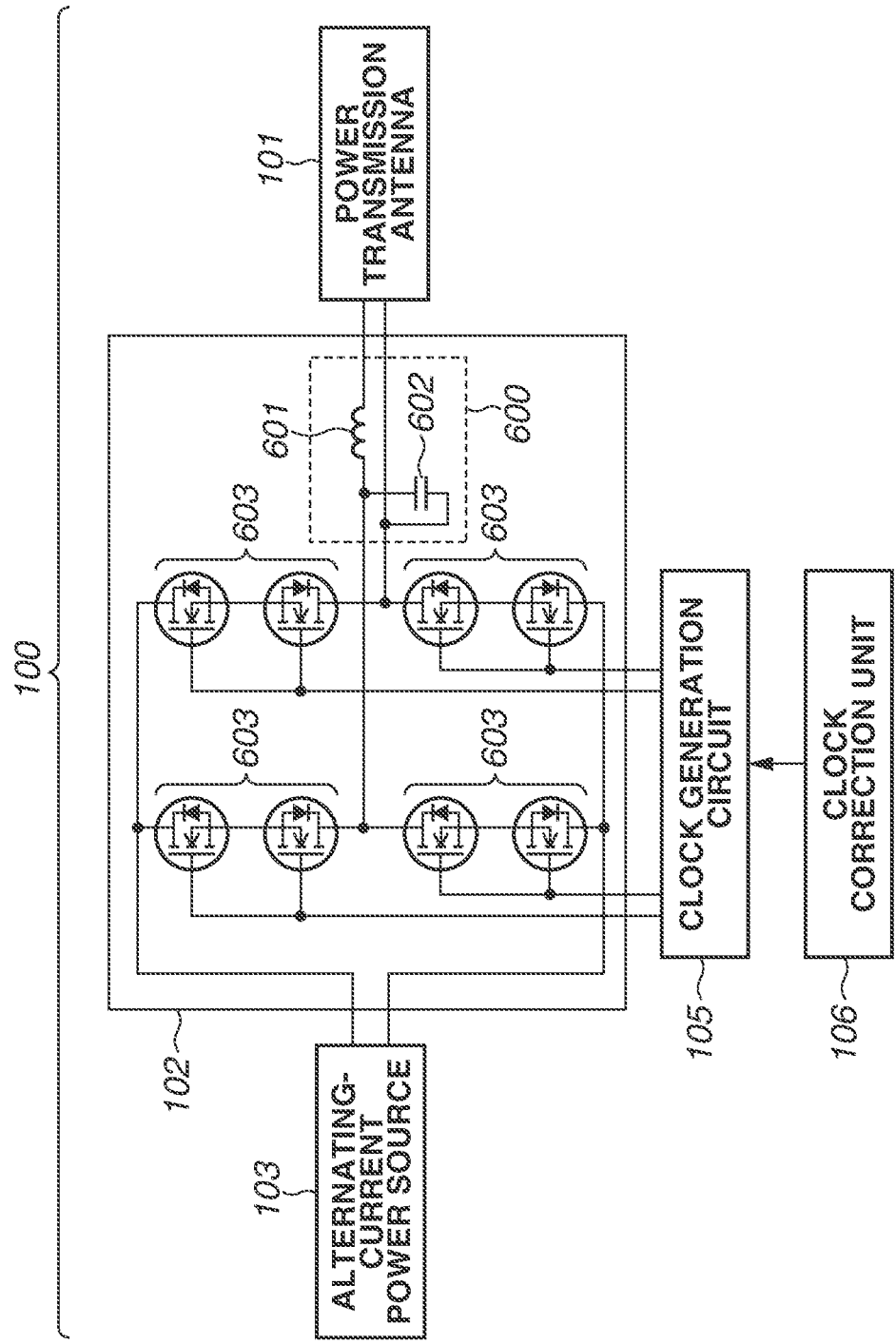
FIG. 2 is a diagram illustrating a configuration example of a switch circuit according to one embodiment.

FIG. 2 is a diagram illustrating a configuration example of the switch circuit 102 that includes a resonance circuit 600. The switch circuit 102 includes four bidirectional switches 603 for performing switching of an alternating-current voltage and the resonance circuit 600. Each of the four bidirectional switches 603 is formed with the sources and gates of two field effect transistors (FETs) connected to each other. This prevents the body diodes of the two FETs from turning on even when either a positive voltage or a negative voltage applied to the drains of the two FETs, so that the switch circuit 102 can perform switching of the alternating-current voltage that has the positive and negative polarities. The clock generation circuit 105 supplies a clock signal to the gates of the bidirectional switches 603. The switch circuit 102 performs switching of the alternating-current voltage supplied from the alternating-current power source 103 at a timing of the clock signal, and outputs to the power transmission antenna 101.

The switch circuit 102 is not limited to this configuration and may be formed of two bidirectional switches (half bridge). If an alternating-current voltage has no negative polarity (alternating-current voltage has a positive polarity alone), the switch circuit 102 may use a single FET instead of bidirectional switches.

The resonance circuit 600 is a circuit that utilizes a resonance phenomenon at the time of switching by the switch circuit 102 to implement a soft switching operation by which switching is performed with a voltage or current of zero. For example, the resonance circuit 600 includes passive elements, an inductor 601 and a capacitor 602, as illustrated in the drawing. The configuration of the resonance circuit 600 illustrated in FIG. 2 is an example, and the resonance circuit 600 is not limited to the illustrated circuit configuration. In addition, instead of providing the resonance circuit 600 with the switch circuit 102, the resonance circuit 600 may be provided with the power transmission antenna 101, the power reception antenna 201, or the rectification circuit 202, or a plurality of resonance circuits 600 may be arranged at a plurality of locations.

The rectification circuit 202 is, for example, an existing diode rectification circuit or a synchronous rectification circuit. If the alternating-current voltage has negative voltage and the rectification circuit 202 performs synchronous rectification, the rectification circuit 202 may have a bidirectional switch as a switching element.

Figure 3:
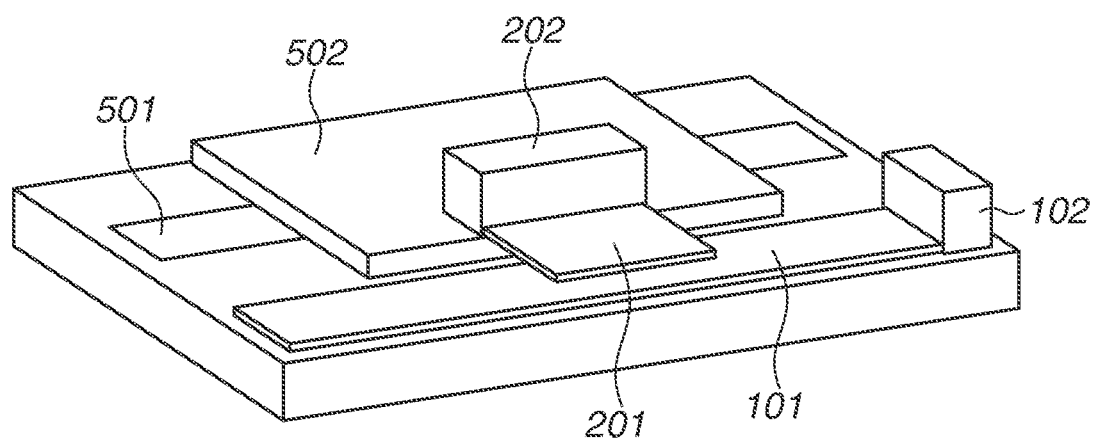
FIG. 3 is a diagram illustrating an external appearance example of the control system.

FIG. 3 is a perspective view of an external appearance example of the control system 300. The power reception antenna 201 and the rectification circuit 202 are mounted on a stage 502 to be moved by a linear motor 501.

The power transmission antenna 101 is longer than the power reception antenna 201. The power transmission antenna 101 and the power reception antenna 201 are arranged to face each other in a non-contact manner even if the stage 502 is at any position in the traveling range of the stage 502. This allows the power reception antenna 201 on the stage 502 at any position to wirelessly receive power from the power transmission antenna 101. The switch circuit 102 is connected to the power transmission antenna 101.

[Motor Driving Waveform for Wireless Power Transmission]

The alternating-current voltage for driving the motor 400 illustrated in FIG. 1 will be described. To turn the rotation direction of the motor 400 to the normal direction or the inverse direction, the polarity of the voltage to be applied to the motor 400 is typically changed to positive or negative. That is, the rectification circuit 202 can control the rotation direction of the motor 400 by supplying the alternating-current voltage to the motor 400.

Japanese Patent Application Laid-Open No. 2018-54847 describes that an alternating-current voltage for controlling the rotation direction of the motor 400 is generated by the power reception unit 200 and a direct-current voltage is applied from the direct-current power source to the power transmission unit 100. The power transmission unit 100 supplies the direct-current voltage to the power reception unit 200 by wireless power transmission, so that the direct-current voltage is supplied to the motor driver (alternating-current power source) in the power reception unit 200. Then, the motor driver generates an alternating-current voltage for controlling the rotation direction of the motor 400.

In the control system 300 according to the present example embodiment, unlike in the configuration described in Japanese Patent Application Laid-Open No. 2018-54847, the power transmission unit 100 directly transmits the alternating-current voltage in a wireless manner, which eliminates the need for a motor driver for the power reception unit 200, which results in a reduced size of the power reception unit 200. The alternating-current power source 103 in the power transmission unit 100 here corresponds to the motor driver described in Japanese Patent Application Laid-Open No. 2018-54847. The alternating-current voltage for controlling the rotation direction of the motor 400 generated by the alternating-current power source 103 is supplied from the power transmission unit 100 to the power reception unit 200 by wireless power transmission, and the output voltage of the power reception unit 200 is applied directly to the motor 400.

High accuracy control by the control system 300, such as motor control for the fine-motion stage in the exposure device, involves the power reception unit 200's accurate restoration of the waveform of the alternating-current voltage generated by the alternating-current power source 103 and application of the alternating-current voltage to the motor 400. Specifically, high accuracy control by the control system 300 involves maintaining the linearity between the alternating-current voltage input into the switch circuit 102 and the alternating-current voltage output from the rectification circuit 202.

The motor 400 can be regarded as a fixed load (load not varying temporally), and the phase (frequency and duty ratio) of a clock signal for switching at the switch circuit 102 is defined. This allows the value of constant of a passive element in the resonance circuit 600 that satisfies the resonance condition (soft switching operation) of the switch circuit 102, the power transmission antenna 101, the power reception antenna 201, the rectification circuit 202, and the motor 400 to be uniquely determined.

The control system 300 sets a uniquely determined value of constant of a passive element in the resonance circuit 600, allowing switching at the switch circuit 102 with the defined phase (frequency and duty ratio) of a clock signal. This ideally maintains the linearity between the alternating-current voltage input into the switch circuit 102 and the alternating-current voltage output from the rectification circuit 202.

[Issues]

However, the passive elements (in particular, the inductor 601) constituting the resonance circuit 600 vary in properties depending on voltage, current, or temperature. The passive elements are the inductor 601 and the capacitor 602. The inductor 601 generally causes magnetic saturation with increases in a current running through the inductor 601 to reduce the inductance by several or several tens of percent, although the degree of the property change varies depending on the core structure and magnetic material of the inductor 601.

The inductor 601 also varies in properties depending on the temperature. In general, the inductor 601 is more likely to cause magnetic saturation at higher temperatures to reduce the inductance by several to several tens of percent. Similarly, the capacitor 602 changes in capacity depending on the voltage and current that is applied, and/or temperature.

If the value of constant of a passive element in the resonance circuit 600 deviates from the preset value due to property changes in the passive elements, the linearity between the alternating-current voltage input into the switch circuit 102 and the alternating-current voltage output from the rectification circuit 202 will not be maintained. As a result, the waveform of the alternating-current voltage to be applied to the motor 400 shifts from a desired value, so that the operation of the motor 400 deviates from a desired operation, which results in a decrease in the accuracy of the control system 300.

Correction Control of the Present Example Embodiment

The control system 300 in the present example embodiment estimates a property change in the passive elements of the resonance circuit 600 to be considered to maintain the linearity between the alternating-current input into the switch circuit 102 and the alternating-current voltage output from the rectification circuit 202, and performs correction to maintain the linearity. Specifically, the control system 300 corrects the phase (frequency and duty ratio) of the clock signal generated by the clock generation circuit 105 or the waveform of the alternating-current voltage output from the alternating-current power source 103. In the present example embodiment, for convenience of description, the inductor 601 alone is taken as a passive element of the resonance circuit 600 to be considered to maintain the linearity.

In the first example embodiment, the control system 300 estimates a property change in the inductor 601 from instructive information on the input voltage value output from the controller 104, and corrects the clock signal.

From the instructive information on the input voltage value output from the controller 104 to the alternating-current power source 103, the clock correction unit 106 recognizes the alternating-current voltage to be supplied from the alternating-current power source 103, estimates a property change in the inductor 601 that will occur at the time of application of the alternating-current voltage, and determines correction values for the clock signal.

Next, a method of estimation by the clock correction unit 106 will be described. For example, the clock correction unit 106 performs estimation from the instructive information with table data prepared about the alternating-current voltage supplied from the alternating-current power source 103 and the amounts of change in the inductor 601, and the amounts of change in the inductor 601 and correction values for a clock signal.

Alternatively, the clock correction unit 106 may perform estimation from the instructive information with a function prepared of the alternating-current voltage supplied from the alternating-current power source 103, the amounts of change in the inductor 601, and the amounts of change in the inductor 601 and the correction values for a clock signal. The clock correction unit 106 may use another estimation method. In the present example embodiment, the method with prepared table data is taken as an example.

FIG. 4B illustrates an example of table data indicating correspondence between input voltage values output from the controller 104 to the alternating-current power source 103 and the amounts of change in inductance value of the inductor 601. The table data is created in advance based on actual measurement, simulation, or theoretical formula.

FIG. 4A illustrates an example of correspondence between the amounts of change in inductance value of the inductor 601 and setting values for a clock signal to be set for the amounts of change. Setting values for a clock signal refer to the frequency and duty ratio of the clock signal to be set to maintain the linearity between the alternating-current voltage input into the switch circuit 102 and the alternating-current voltage output from the rectification circuit 202. The table data is also created in advance based on actual measurement, simulation, or theoretical formula.

The clock correction unit 106 determines the frequency and duty ratio of the clock signal generated by the clock generation circuit 105 using both the table data illustrated in FIGS. 4A and 4B based on the instructive information on the input voltage value output from the controller 104.

Specifically, if the input voltage value is 5 V, the clock correction unit 106 sets the frequency of the clock signal to 1.88 MHz and sets the duty ratio of the clock signal to 0.43.

If the input voltage value is 25 V, the clock correction unit 106 sets the frequency of the clock signal to 1.87 MHz and sets the duty ratio of the clock signal to 0.44.

The clock generation circuit 105 generates a clock signal with the frequency and duty ratio set by the clock correction unit 106, and outputs the generated clock signal to the gates of the bidirectional switches 603 in the switch circuit 102.

As stated above, the control system 300 includes the power transmission unit 100, which wirelessly transmits the alternating-current power, and the power reception unit 200, which wirelessly receives the power from the power transmission unit 100. The alternating-current power source 103 outputs the alternating-current power based on the input voltage value. The clock generation circuit 105 is a clock generation unit that generates a clock signal higher in frequency than the above-described alternating-current power. The switch circuit 102 performs switching of the above-described alternating-current power at a timing determined by the clock signal.

The power transmission antenna 101 wirelessly transmits the power subjected to the switching by the switch circuit 102. The power reception antenna 201 wirelessly receives the power from the power transmission antenna 101. The rectification circuit 202 rectifies the voltage output from the power reception antenna 201 and outputs the alternating-current power.

The clock correction unit 106 estimates a property change in one or more passive elements included in at least one of the power transmission unit 100 or the power reception unit 200, and performs correction to maintain the linearity between the alternating-current power output from the alternating-current power source 103 and the alternating-current power output from the rectification circuit 202. The clock correction unit 106 estimates a property change in the one or more passive elements based on the input voltage value to the alternating-current power source 103, and corrects the phase of the clock signal generated by the clock generation circuit 105. Specifically, the clock correction unit 106 corrects the frequency or duty ratio of the clock signal generated by the clock generation circuit 105. It is more suitable that the clock correction unit 106 corrects the frequency and duty ratio of the clock signal generated by the clock generation circuit 105.

The above-described one or more passive elements are provided in the switch circuit 102, the power transmission antenna 101, the power reception antenna 201, or the rectification circuit 202. The described above passive element is a passive element of the resonance circuit 600. The passive element is the inductor 601 or the capacitor 602.

The switch circuit 102 is a full-bridge circuit of the bidirectional switches 603 as illustrated in FIG. 2, for example. The rectification circuit 202 is a full-bridge circuit of the bidirectional switches. The power reception antenna 201 is movable relative to the power transmission antenna 101 as illustrated in FIG. 3.

As described above, the clock correction unit 106 estimates a property change in the passive element of the resonance circuit 600, and corrects the clock signal generated by the clock generation circuit 105. This allows the control system 300 to maintain the linearity between the alternating-current voltage input into the switch circuit 102 and the alternating-current voltage output from the rectification circuit 202.

A control system 300 according to a second example embodiment will be described. In the present example embodiment, the control system 300 directly measures a current running through an inductor 601 that is a passive element to be considered to maintain the linearity, estimates a property change in the inductor 601 based on the measurement result, and corrects the clock signal.

Figure 5:
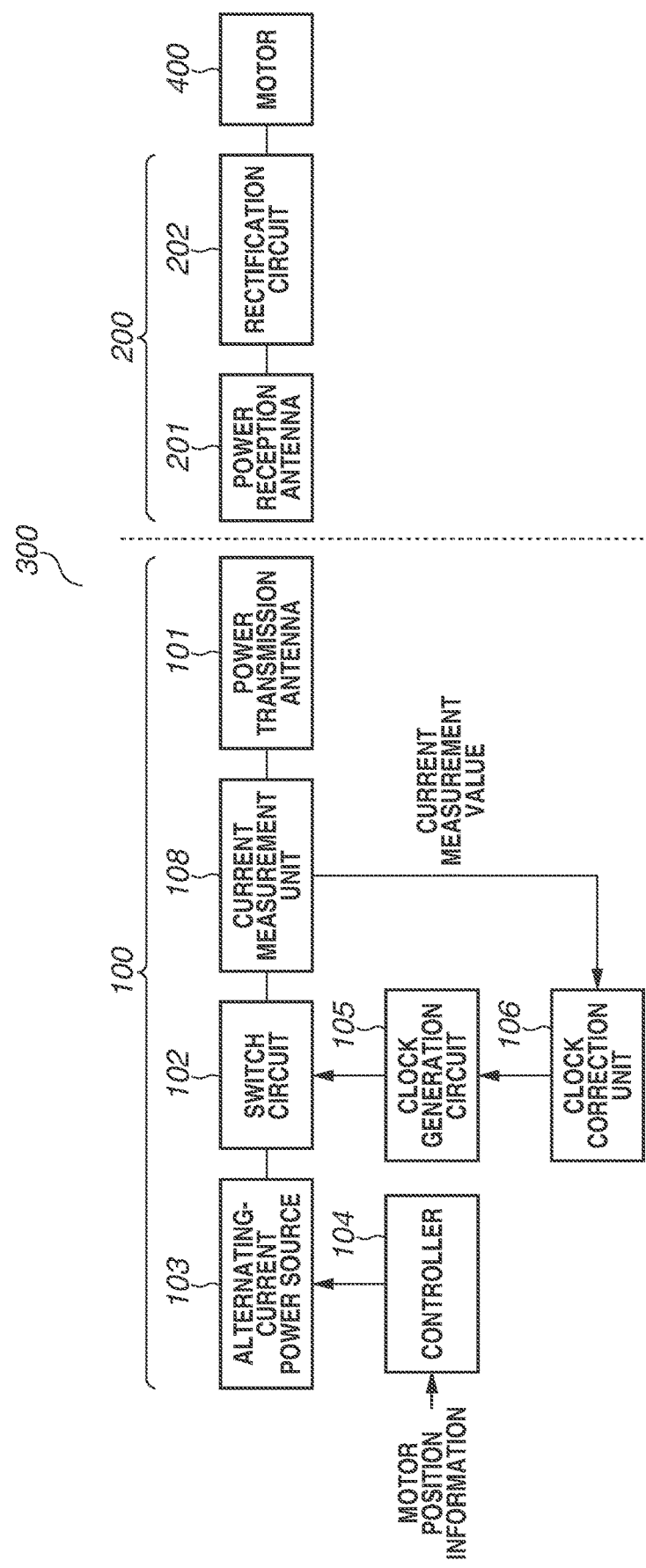
FIG. 5 is a block diagram illustrating a configuration example of a control system according to one embodiment.

FIG. 5 is a diagram illustrating a configuration example of the control system 300 according to the second example embodiment. In the configuration of FIG. 5, a current measurement unit 108 is added to the configuration of FIG. 1. Hereinafter, differences between the second example embodiment and the first example embodiment will be described.

A power transmission unit 100 includes the current measurement unit 108. The current measurement unit 108 is disposed between a switch circuit 102 and a power transmission antenna 101 and connected to the switch circuit 102 and the power transmission antenna 101. The current measurement unit 108 measures a current running through the inductor 601, and outputs the measurement result as the current measurement value to a clock correction unit 106. The clock correction unit 106 estimates a property change in the inductor 601 from the current measurement value input from the current measurement unit 108, and determines the correction values for the clock signal. As a specific estimation method, the clock correction unit 106 may perform estimation using table data or function as in the first example embodiment. In the present example embodiment, a method in which table data is prepared in advance is taken as an example.

FIG. 4C illustrates an example of table data indicating the correspondence between values of a current measured by the current measurement unit 108 and the amounts of change in inductance value of the inductor 601. The table data is created in advance based on actual measurement, simulation, or theoretical formula.

The clock correction unit 106 uses both the table data in FIG. 4A and the table data in FIG. 4C to determine the frequency and duty ratio of the clock signal generated by the clock generation circuit 105, from the current measurement value from the current measurement unit 108.

Specifically, for example, if the current measurement value from the current measurement unit 108 is 0.5 A, the clock correction unit 106 sets the frequency of the clock signal to 1.88 MHz and sets the duty ratio of the clock signal to 0.43. If the current measurement value from the current measurement unit 108 is 2.5 A, the clock correction unit 106 sets the frequency of the clock signal to 1.87 MHz and sets the duty ratio of the clock signal to 0.44.

As above, according to the present example embodiment, the clock correction unit 106 can estimate a property change in the passive element of the resonance circuit 600 and correct the clock signal, thereby to maintain the linearity between the alternating-current voltage input into the switch circuit 102 and the alternating-current voltage output from a rectification circuit 202.

The control system 300 may have a configuration based on both the first example embodiment and the second example embodiment.

Specifically, the clock correction unit 106 may accept the input of the current measurement value from the current measurement unit 108 and the input voltage value from the controller 104, and use the table data in FIGS. 4A to 4C to determine the correction values for the clock signal. According to this configuration, the clock correction unit 106 can correct the clock signal based on the two types of information, thereby improving reliability.

In the present example embodiment, the clock correction unit 106 estimates a property change in the passive element of the resonance circuit 600 from the current value measured by the current measurement unit 108, but the method is not limited to this. Alternatively, the power reception unit 200 may measure the voltage value of the passive element of the resonance circuit 600, and the clock correction unit 106 may estimate a property change in the passive element of the resonance circuit 600 based on the measured voltage value.

As above, the clock correction unit 106 estimates a property change in the passive element of the resonance circuit 600 based on the value of a current running through the passive element of the resonance circuit 600 or the value of a voltage applied to the passive element of the resonance circuit 600, and corrects the phase of the clock signal generated by the clock generation circuit 105. Alternatively, the clock correction unit 106 may estimate a property change in the passive element, based on the input voltage value to the alternating-current power source 103 and the value of a current running through the passive element or the value of a voltage applied to the passive element, and correct the phase of a clock signal generated by the clock generation circuit 105.

A control system 300 according to a third example embodiment will be described. In the present example embodiment, the control system 300 measures the surface temperature or surrounding temperature of an inductor 601 that is a passive element to be considered to maintain the linearity, estimates a property change in the inductor 601 based on the measurement result, and corrects a clock signal.

Figure 6:
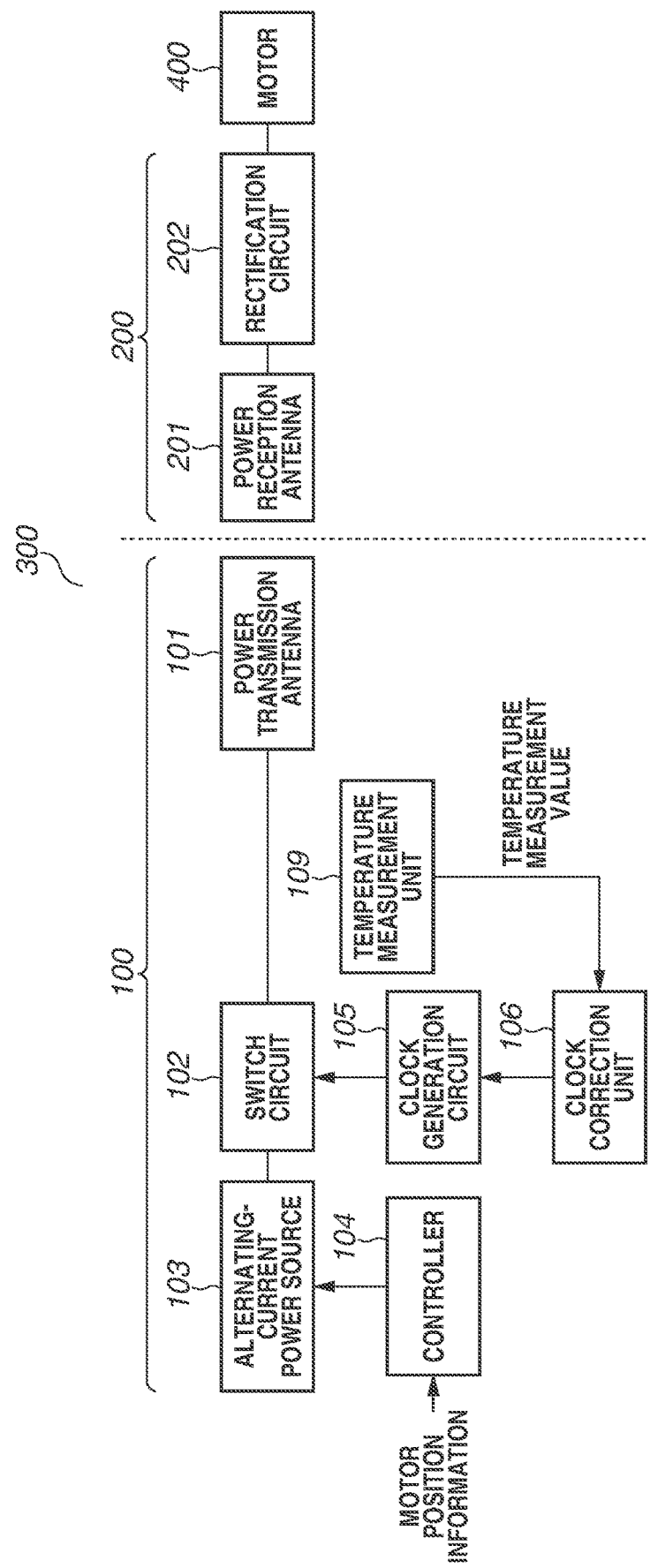
FIG. 6 is a block diagram illustrating a configuration example of a control system according to one embodiment.

FIG. 6 is a diagram illustrating a configuration example of the control system 300 according to the third example embodiment. In the configuration of FIG. 6, a temperature measurement unit 109 is added to the configuration of FIG. 1. Hereinafter, differences of the third example embodiment from the first example embodiment will be described.

A power transmission unit 100 includes the temperature measurement unit 109. The temperature measurement unit 109 measures the surface temperature or surrounding temperature of the inductor 601, and outputs the measurement result as a temperature measurement value to a clock correction unit 106. The clock correction unit 106 estimates a property change in the inductor 601 from the temperature measurement value input from the temperature measurement unit 109, and determines correction values for the clock signal. As a specific estimation method, the clock correction unit 106 may perform estimation using table data or function as in the first example embodiment and the second example embodiment. In the present example embodiment, a method in which table data is prepared in advance is taken as an example.

FIG. 4D illustrates an example of table data indicating the correspondence between values of the temperature measured by a current measurement unit 108 and the amounts of change in inductance value of the inductor 106. The table data is created in advance based on actual measurement, simulation, or theoretical formula.

The clock correction unit 106 uses both the table data in FIG. 4A and table data in FIG. 4D to determine the frequency and duty ratio of the clock signal generated by a clock generation circuit 105, from the temperature measurement value from the temperature measurement unit 109.

Specifically, for example, if the temperature measurement value from the temperature measurement unit 109 is 15° C., the clock correction unit 106 sets the frequency of the clock signal to 1.88 MHz and sets the duty ratio of the clock signal to 0.43. If the temperature measurement value from the temperature measurement unit 109 is 70° C., the clock correction unit 106 sets the frequency of the clock signal to 1.87 MHz and sets the duty ratio of the clock signal to 0.44.

As above, according to the present example embodiment, the clock correction unit 106 can estimate a property change in the passive element of the resonance circuit 600 and correct the clock signal, thereby to maintain the linearity between the alternating-current voltage input into a switch circuit 102 and the alternating-current voltage output from a rectification circuit 202.

The control system 300 may have a configuration based on both the first or second example embodiment and the third example embodiment. Specifically, the clock correction unit 106 may accept the input of the temperature measurement value from the temperature measurement unit 109 and the current measurement value from the current measurement unit 108, and use the tables in FIGS. 4A, 4C, and 4D to determine the correction values for the clock signal. In reality, a property change in the passive element of the resonance circuit 600 complicatedly relates to both the current value (or voltage value) and temperature. Thus, it is suitable that the control system 300 creates table data by not simply adding up the amounts of change in the passive element but determining in advance the relationship between three parameters, current value (or voltage value), temperature, and the amount of change in the passive element, based on actual measurement, simulation, or theoretical formula.

As above, the clock correction unit 106 estimates a property change in the passive element of the resonance circuit 600 based on the temperature of the passive element, and corrects the phase of the clock signal generated by the clock generation circuit 105. Alternatively, the clock correction unit 106 may estimate a property change in the passive element based on the value of a current running through the passive element or the value of a voltage applied to the passive element and the temperature of the passive element, and correct the phase of the clock signal generated by the clock generation circuit 105.

A fourth example embodiment will be described. The control systems 300 according to the first to third example embodiments maintain the linearity of the alternating-current voltage waveform by correcting the phase of the clock signal (frequency and duty ratio). As described above, however, the control system 300 may correct the waveform of the alternating-current voltage output from the alternating-current power source 103.

A control system 300 in the fourth example embodiment measures the surface or surrounding temperature of an inductor 601 that is a passive element to be considered to maintain the linearity, estimates a property change in the inductor 601, and corrects the value of an input voltage to an alternating-current power source 103.

Figure 7:
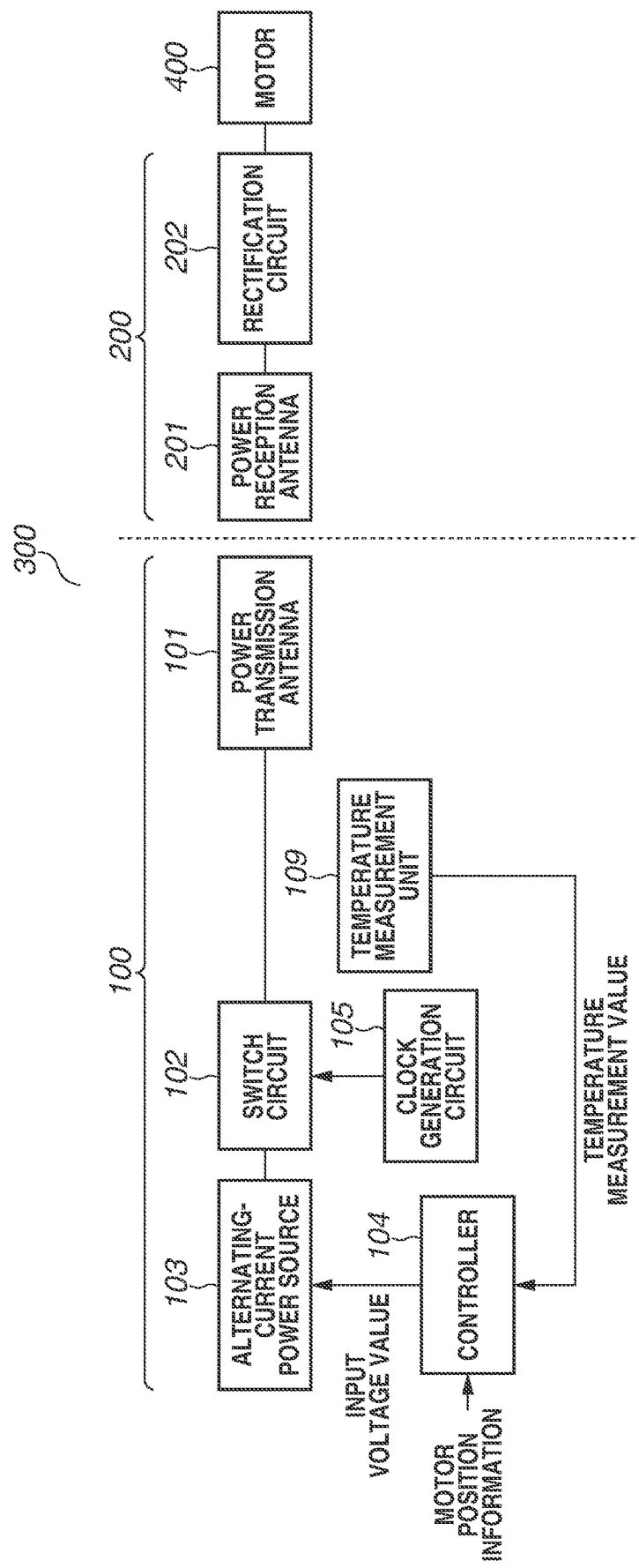
FIG. 7 is a block diagram illustrating a configuration example of a control system according to one embodiment.

FIG. 7 is a diagram illustrating a configuration example of the control system 300 according to the fourth example embodiment. In the configuration of FIG. 7, the clock correction unit 106 is deleted from the configuration of FIG. 6. Hereinafter, differences of the fourth example embodiment from the third example embodiment will be described.

A temperature measurement unit 109 measures the surface temperature or surrounding temperature of the inductor 601, and outputs the measurement result as a temperature measurement value to a controller 104. The controller 104 determines the input voltage value based on motor position information related to a motor 400, estimates a property change in the inductor 601 from the temperature measurement value input from the temperature measurement unit 109, and determines a correction coefficient for the input voltage value.

A correction coefficient for the input voltage value here refers to the amount of increase or decrease in the input voltage value to be set to maintain the linearity between the alternating-current voltage input to the switch circuit 102 and the alternating-current voltage output from the rectification circuit 202 in a predetermined range with respect to the amount of change in the inductor 601. As a method for determining the correction coefficient, the controller 104 can determine the correction coefficient using table data or a function. In the present example embodiment, a method in which table data is prepared in advance is taken as an example.

FIG. 4E illustrates an example of table data indicating the correspondence between the amounts of change in the inductance value of the inductor 601 and correction coefficients for an input voltage value. The table data is created in advance based on actual measurement, simulation, or theoretical formula. The controller 104 corrects the input voltage value to the alternating-current power source 103 using both table data in FIG. 4D and table data in FIG. 4E.

Specifically, for example, if the value of temperature measurement by the temperature measurement unit 109 is 15° C., the controller 104 outputs the input voltage value determined based on the motor position information to the alternating-current power source 103 without correction. If the temperature measurement value from the temperature measurement unit 109 is 70° C., the controller 104 increases by 5% the input voltage value determined based on the motor position information (multiplication by 1.05 times), and outputs the corrected input voltage value to the alternating-current power source 103.

As above, according to the present example embodiment, the controller 104 estimates a property change in the passive element of the resonance circuit 600, and corrects the waveform of the alternating-current voltage output from the alternating-current power source 103. This allows the controller 104 to maintain the linearity between the alternating-current voltage input to the switch circuit 102 and the alternating-current voltage output from the rectification circuit 202.

In the present example embodiment, the controller 104 estimates a property change in the passive element through temperature measurement by the temperature measurement unit 109. However, the method is not limited to this. As in the first example embodiment, the controller 104 may estimate a property change in the passive element of the resonance circuit 600 based on the input voltage value determined from the motor position information (or based on the motor position information), for example, with the table data in FIG. 4B and the table data in FIG. 4E prepared in advance. Alternatively, as in the second example embodiment, the controller 104 may estimate a property change in the passive element based on the measurement value of a current running through the passive element), for example, with the table data in FIG. 4C and the table data in FIG. 4E.

As stated above, the controller 104 estimates a property change in one or more passive elements included in at least one of the power transmission unit 100 or the power reception unit 200, and performs correction to maintain the linearity between the alternating-current power output from the alternating-current power source 103 and the alternating-current power output from the rectification circuit 202.

The controller 104 is a correction unit that corrects alternating-current power output from the alternating-current power source 103.

Specifically, the controller 104 corrects the input voltage value to the alternating-current power source 103.

[Verification of Effects by Simulation]

Figure 8:
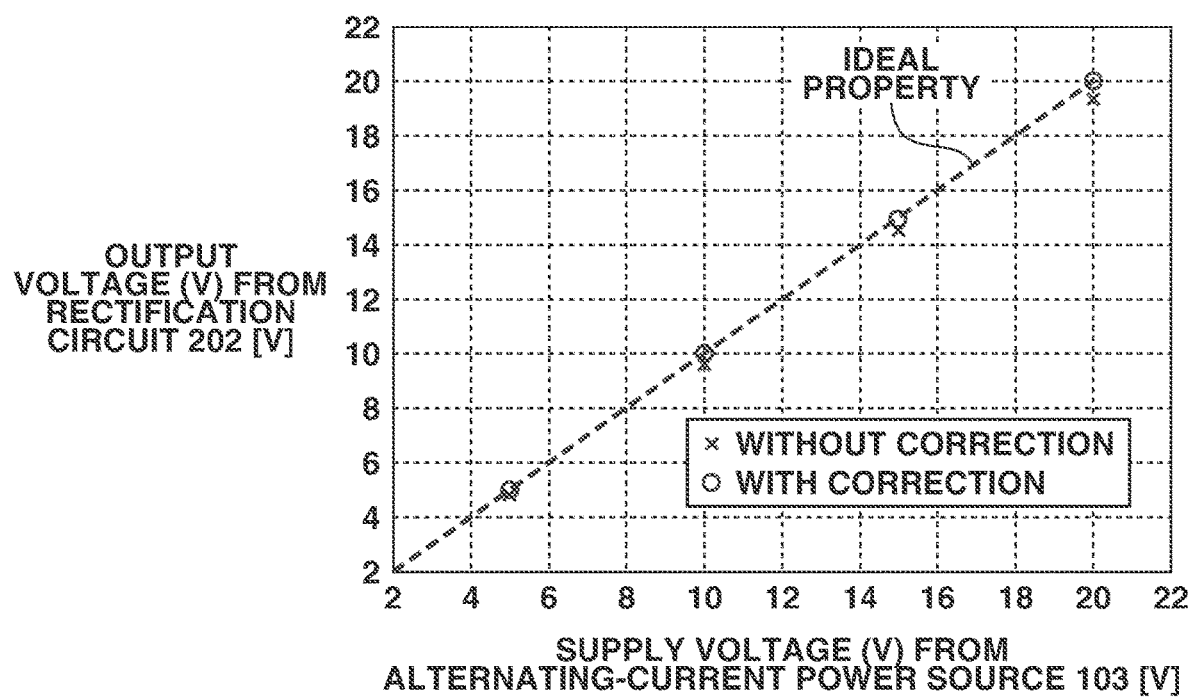
FIG. 8 is a diagram illustrating simulation results according to one embodiment.

FIG. 8 illustrates the results of analysis of the relationship between the alternating-current voltage supplied from the alternating-current power source 103 and the alternating-current voltage output from the rectification circuit 202 with a circuit simulator. The lateral axis indicates the voltage supplied from the alternating-current power source 103, the vertical axis indicates the voltage output from the rectification circuit 202, and the broken line indicates ideal property. For example, if the alternating-current power source 103 outputs 10.0 V, the rectification circuit 202 outputs 10.0 V. At this time, the frequency of the clock signal to the switch circuit 102 is 1.88 MHz, and the duty ratio of the clock signal is 0.43.

Plots of "x" indicate a property without correction by the clock correction unit 106. The properties indicated by the plots of "x" are properties with which the inductance value of the inductor 601 included in the passive element decreases by 20% from the designed value. Without the correction by the clock correction unit 106, the voltages output from the rectification circuit 202 become lower about 3.5% than the voltage supplied from the alternating-current power source 103. For example, if the alternating-current power source 103 outputs 10 V, the rectification circuit 202 outputs 9.65 V.

On the other hand, plots of "○" indicate properties with correction by the clock correction unit 106. The properties indicated by the plots of "○" are properties with which the inductance of the inductor 601 is decreased by 20% from the designed value, and the frequency of the clock signal to the switch circuit 102 is corrected to 1.87 MHz and the duty ratio of the clock signal is corrected to 0.44. As a result of the correction, the properties indicated by the plots of "○" become equivalent to the ideal properties indicated by the broken line. For example, if the alternating-current power source 103 outputs 10.0 V, the rectification circuit 202 outputs 10.0 V.

As described above in relation to the first to third example embodiments, the clock correction unit 106 can correct a clock signal to maintain the linearity of alternating-current voltage waveform even with a property change in the passive element that occurs.

In addition, as described above in relation to the fourth example embodiment, if the output voltage from the rectification circuit 202 decreases by 3.5%, the controller 104 causes the alternating-current power source 103 to output a 3.5%-increased supply voltage. This can be easily expected to maintain the linearity of the alternating-current voltage waveform even with a property change in the passive element that occurs.

In this simulation, for the convenience of description, it is assumed that the properties of the inductor are changed due to temperature change alone. In reality, however, the properties of the inductor may also change due to a current running through the passive element or a voltage applied to the passive element. Thus, it is suitable that the clock correction unit 106 performs corrections taking this into account.

[Supplementary Explanation on Plurality of Example Embodiments]

In the first to fourth example embodiments, the control system 300 performs corrections based on a property change in a passive element included in the resonance circuit 600. However, the configuration is not limited to this.

For example, the control system 300 may perform corrections based on a property change in a passive element included in the transmission circuit 100 or the reception unit 200 such as a filter circuit or an isolator circuit.

In the first to fourth example embodiments, the control system 300 performs corrections based on a property change in the inductor 601. However, the configuration is not limited to this. The control system 300 may perform corrections based on a property change in the capacitor 602 or a plurality of passive elements.

In relation to the first to third example embodiments, the control system 300 corrects both the frequency and duty ratio of a clock signal. However, the configuration is not limited to this. The control system 300 may correct either the frequency or duty ratio of a clock signal as long as the linearity of an alternating-current voltage waveform falls within a desired range.

In the second and third example embodiments, the current measurement unit 108 or the temperature measurement unit 109 is installed in the power transmission unit 100. However, the configuration is not limited to this. If a passive element of the resonance circuit 600 to be considered to maintain the linearity is located in the power reception unit 200, it is suitable that the current measurement unit 108 or the temperature measurement unit 109 is installed in the power reception unit 200. In that case, the measurement value from the current measurement unit 108 or the temperature measurement unit 109 is transmitted from the power reception unit 200 to the power transmission unit 100 via wired or wireless communication.

In the first to fourth example embodiments, the control system 300 maintains the linearity of an alternating-current voltage waveform. However, the configuration is not limited to this. The control system 300 may maintain the linearity of an alternating-current waveform or an alternating-current power waveform.

The table data in FIGS. 4A to 4E is provided in three lines (for example, the amount of change in the inductance value of the inductor 601 is equally divided into three sections "0%", "−10%", and "−20%"). However, the configuration is not limited to this. With an increase in the lines of table data, finer correction becomes available, thereby allowing the linearity to be maintained with higher accuracy. The table data in FIGS. 4A to 4E may be combined into one piece of table data or may be further subdivided.

In the first to fourth example embodiments, the controller 104, the clock generation circuit 105, and the clock correction unit 106 are illustrated in different blocks. Alternatively, in other embodiments, these components may be arranged in the same digital signal processor (DSP) or microcomputer. The first to fourth example embodiments may also be used in combination in other embodiments.

The above-described example embodiments are all mere specific examples for carrying out various embodiments of the present disclosure, and the technical scope of the present invention should not be interpreted in a limited way due to these example embodiments. That is, embodiments of the present disclosure can be carried out in various formats without deviating from the technical idea or principal features thereof.

According to various embodiments of the present disclosure, the linearity between the alternating-current power output from an alternating-current power source and the alternating-current power output from a rectification circuit can be maintained.

While example embodiments have been described, it is to be understood that the invention is not limited to the disclosed example embodiments. The scope of the following claims is to be accorded the broadest interpretation so as to encompass all such modifications and equivalent structures and functions.

This application claims the benefit of Japanese Patent Application No. 2021-157656, filed Sep. 28, 2021, which is hereby incorporated by reference herein in its entirety.

What is claimed is:

1. A control system comprising:
a power transmission unit configured to wirelessly transmit alternating-current power; and
a power reception unit configured to wirelessly receive the power from the power transmission unit,
wherein the power transmission unit includes:
an alternating-current power source configured to output the alternating-current power;
a clock generation unit configured to generate a clock signal higher in frequency than the alternating-current power;
a switch circuit configured to perform switching the alternating-current power at a timing determined by the clock signal; and
a power transmission antenna configured to wirelessly transmit the power subjected to performing switching by the switch circuit,
wherein the power reception unit includes:
a power reception antenna configured to wirelessly receive the power from the power transmission antenna; and
a rectification circuit configured to rectify a voltage output from the power reception antenna and output the alternating-current power, and
wherein the control system includes a correction unit configured to estimate a property change in one or more passive elements included in at least one of the power transmission unit or the power reception unit, and correct a phase of the clock signal or the alternating-current power output from the alternating-current power source to maintain linearity between the alternating-current power output from the alternating-current power source and the alternating-current power output from the rectification circuit.

2. The control system according to claim 1, wherein the power transmission unit includes the correction unit.

3. The control system according to claim 1, wherein the correction unit corrects a frequency or duty ratio of the clock signal.

4. The control system according to claim 1,
wherein the alternating-current power source outputs the alternating-current power based on an input voltage value, and
wherein the correction unit corrects the input voltage value.

5. The control system according to claim 1,
wherein the alternating-current power source outputs the alternating-current power based on an input voltage value, and
wherein the correction unit estimates the property change in the one or more passive elements based on the input voltage value.

6. The control system according to claim 1, wherein the correction unit estimates the property change in the one or more passive elements based on a value of a current running through the one or more passive elements or a value of a voltage applied to the one or more passive elements.

7. The control system according to claim 1, wherein the correction unit estimates the property change in the one or more passive elements based on a temperature of the one or more passive elements.

8. The control system according to claim 4, wherein the correction unit estimates the property change in the one or more passive elements based on the input voltage value and a value of a current running through the one or more passive elements or a value of a voltage applied to the one or more passive elements.

9. The control system according to claim 1, wherein the correction unit estimates the property change in the one or more passive elements based on a value of a current running the one or more passive elements or a value of a voltage applied to the one or more passive elements and a temperature of the one or more passive elements.

10. The control system according to claim 1, wherein the one or more passive elements are provided in the switch circuit, the power transmission antenna, the power reception antenna, or the rectification circuit.

11. The control system according to claim 1, wherein the one or more passive elements are one or more passive elements of a resonance circuit.

12. The control system according to claim 1, wherein the one or more passive elements are one or more inductors and/or one or more capacitors.

13. The control system according to claim 1, wherein the switch circuit is a full-bridge circuit of a bidirectional switch.

14. The control system according to claim 1, wherein the rectification circuit is a full-bridge circuit of a bidirectional switch.

15. The control system according to claim 1, wherein the power reception antenna is movable relative to the power transmission antenna.

16. A control method for a control system including a power transmission unit configured to wirelessly transmit alternating-current power and a power reception unit configured to wirelessly receive the power from the power transmission unit, the control method comprising:

outputting the alternating-current power by an alternating-current power source of the power transmission unit;

generating a clock signal higher in frequency than the alternating-current power by a clock generation unit of the power transmission unit;

performing switching the alternating-current power at a timing determined by the clock signal by a switch circuit of the power transmission unit; and wirelessly transmitting the power subjected to performing switching by the switch circuit by a power transmission antenna of the power transmission unit, wirelessly receiving the power from the power transmission antenna by a power reception antenna of the power reception unit;

rectifying a voltage output from the power reception antenna and outputting the alternating-current power by a rectification circuit of the power reception unit, and estimating a property change in one or more passive elements included in at least one of the power transmission unit or the power reception unit, and correcting a phase of the clock signal or the alternating-current power output from the alternating-current power source to maintain linearity between the alternating-current power output from the alternating-current power source and the alternating-current power output from the rectification circuit.

\* \* \* \* \*